(12) United States Patent
Teh

(10) Patent No.: US 11,301,412 B2
(45) Date of Patent: Apr. 12, 2022

(54) SCALING INTERFACE ARCHITECTURE BETWEEN MEMORY AND PROGRAMMABLE LOGIC

(71) Applicant: Intel Corporation, Santa Clara, CA (US)

(72) Inventor: Chee Hak Teh, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 961 days.

(21) Appl. No.: 15/853,005

(22) Filed: Dec. 22, 2017

(65) Prior Publication Data

US 2019/0197006 A1    Jun. 27, 2019

(51) Int. Cl.
*G06F 13/42* (2006.01)
*G06F 13/40* (2006.01)
*G06F 13/16* (2006.01)

(52) U.S. Cl.
CPC ...... *G06F 13/4239* (2013.01); *G06F 13/1673* (2013.01); *G06F 13/4059* (2013.01); *G06F 13/4282* (2013.01)

(58) Field of Classification Search
CPC .............. G06F 3/4239; G06F 13/1673; G06F 13/4059; G06F 13/4282; G06F 13/4239
See application file for complete search history.

(56) References Cited

U.S. PATENT DOCUMENTS

| | | | |
|---|---|---|---|
| 9,811,263 B1 * | 11/2017 | Teh | G06F 13/1668 |
| 2014/0136737 A1 * | 5/2014 | Dreps | G06F 1/12 710/52 |
| 2014/0145758 A1 * | 5/2014 | Atsatt | H03K 19/017581 326/41 |
| 2014/0372654 A1 * | 12/2014 | Pelt | G06F 13/4018 710/305 |
| 2015/0109024 A1 * | 4/2015 | Abdelfattah | G06F 30/34 326/41 |
| 2015/0149809 A1 * | 5/2015 | Feero | G06F 13/4059 713/600 |
| 2019/0050325 A1 * | 2/2019 | Malladi | H01L 25/18 |

* cited by examiner

*Primary Examiner* — Phong H Dang
(74) *Attorney, Agent, or Firm* — Fletcher Yoder PC

(57) ABSTRACT

Systems and methods for an interface with a widened interface-to-fabric shoreline between semiconductor circuits and a narrower interface-to-memory controller shoreline. The interface providing transitions from a first clock of a first circuit (e.g., field-programmable gate array (FPGA)), a second clock of a second circuit (e.g., high-bandwidth memory generation 2 (HBM2) stack, and a third clock of a physical layer of the second circuit. A first transfer between the first clock and the second clock may use a first set of first-in first-outs (FIFO) buffers, such as rate-matching FIFO buffers. A second transfer between the second clock and the third clock may use a second set of FIFO buffers, such as phase compensation FIFOs.

17 Claims, 6 Drawing Sheets

SCALING INTERFACE ARCHITECTURE BETWEEN MEMORY AND PROGRAMMABLE LOGIC

BACKGROUND

The present disclosure relates generally to integrated circuit devices with interconnects between one or more die of a package. More particularly, the present disclosure relates scaling the interface architecture for uniform interface bus to high-bandwidth memory.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Dynamic Random Access Memory (DRAM) devices may use one or more in-package memory solutions. For instance, high-bandwidth memory generation 2 (HBM2) may be used. HBM2 may interface with a field programmable gate array (FPGA) via a Universal Interface Bus (UIB). However, HBM2 may produce/consume more bandwidth than a core fabric of the FPGA may sustain with its interface bandwidth.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An architectural solution may enable a widened interface-to-fabric shoreline without the disadvantages of only widening of the interface-to-fabric shoreline by providing transitions from a first clock of a first circuit (e.g., field-programmable gate array (FPGA) core), a second clock of a second circuit (e.g., high-bandwidth memory generation 2 (HBM2)) controller, and a third clock of a physical layer of the second circuit. A first transfer between the first clock and the second clock may use a first set of first-in first-outs (FIFOs), such as rate-matching FIFOs. A second transfer between the second clock and the third clock may use a second set of FIFOs, such as phase compensation FIFOs.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon referencing the drawings in which.

DETAILED DESCRIPTION OF SPECIFIC EMBODIMENTS

Figure 1:
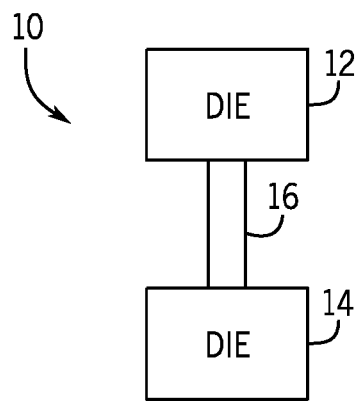
FIG. 1 is a block diagram of an integrated circuit device having multiple die therein, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design of projects/products, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, the bandwidth though a semi-conductor package (e.g., FPGA-memory package) may be limited by its interface(s). In some embodiments, a width (e.g., 6 mm) of micro-bumps of the interface connecting to a first circuit (e.g., FPGA) may be a limiting factor in the communication between the first circuit and a second circuit (e.g., HBM2 memory stack). For example, the second circuit may produce/consume up four times the bandwidth than the first circuit can handle. Widening the interfacing/shoreline of the interfaces may be used to address this issue. However, in some embodiments, the micro-bump interface may not be widened and still maintain equidistant spacing on the interfaces to preserve a matched interface architecture as specified in at least one portion's specification. Moreover, widening the interface-to-fabric shoreline may also result in higher clock insertion latency to input/output (IO) drivers/receivers for the interconnection resulting in degradation of the channel timings. Furthermore, widening the interface-to-fabric shoreline may also introduce varying latencies across different channels due to the lengths of the channel routes causing some channels look and behave differently than other channels.

As a further issue, user configurations running in the first circuit (e.g., FPGA) may close timing to a frequency that may not be an integer division of the second circuit frequency. With different channels running at different frequencies, it may be difficult or impossible to build a generic solution that will perform appropriately across different configurations and operations. To address these issues, an architectural solution may be introduced to enable a widened interface-to-fabric shoreline without the disadvantages of only widening of the interface-to-fabric shoreline that transitions from a first frequency of the first circuit, a second frequency of the second circuit, and a third frequency of a physical layer of the second circuit. The architecture described below also offers an efficient way for the circuits to solve the timing closure requirements of user IPs.

Furthermore, as discussed below, the architecture also facilitates flexible timing closures for the different user configurations to interface between the circuits without compromising performance of other channels by decoupling the user configuration frequencies. Such an architecture allows a slower programmable fabric (e.g., FPGA core fabric) to fully extract the bandwidth provided by memory without compromising the fabric routability of the programmable fabric. The architecture also scales the interface architecture to allow for widened interface-to-fabric shoreline without degrading the memory channel timings or internal timing closure. To resolve the mismatch in bandwidth between a HBM2 and a core fabric, the interface-to-fabric shoreline may be widened while preserving a narrower shoreline to the HBM2 stack to keep equidistant routing on interconnects.

FIG. 1 illustrates an embodiment of an integrated circuit (IC) package 10 that includes a die 12 and one or more die 14 that are packaged together in the IC package 10. The die 12 may be any circuitry disposable on semiconductor substrates. For example, the die 12 may include processing circuitry, such as those found in a central processing unit (CPU) or programmable circuitry. In another example, the die 12 may include programmable logic circuitry of a programmable logic device, such as a field programmable gate array (FPGA). Additionally or alternatively, the die 12 may include any circuitry that interacts with other circuitry in the one or more die 14. Similarly, the die 14 may include any circuitry (e.g., CPU, FPGA, memory, transceiver, etc.) that interacts with circuitry of the die 12. The IC package 10 may be then packaged together to protect the circuitry from outside elements or to distribute heat generated by the circuitry of the die 12 and 14. The packaging also facilitates connection to the die 12 and the one or more die 14 via an interconnect 16. In some embodiments, the interconnect 16 may include a silicon bridge, such as an embedded multi-die interconnect bridge (EMIB).

The package 10 may utilize high-bandwidth memory generation 2 (HBM2) DRAM as an in-package memory (e.g, in the die 14). In some embodiments, the HBM2 memory stack interfaces to the die 12 over the interconnect 16, such as a silicon bridge. However, as previously noted, the HBM2 stack may produce and/or consume more bandwidth than what the die 12 (e.g., FPGA core fabric) can sustain.

Figure 2:
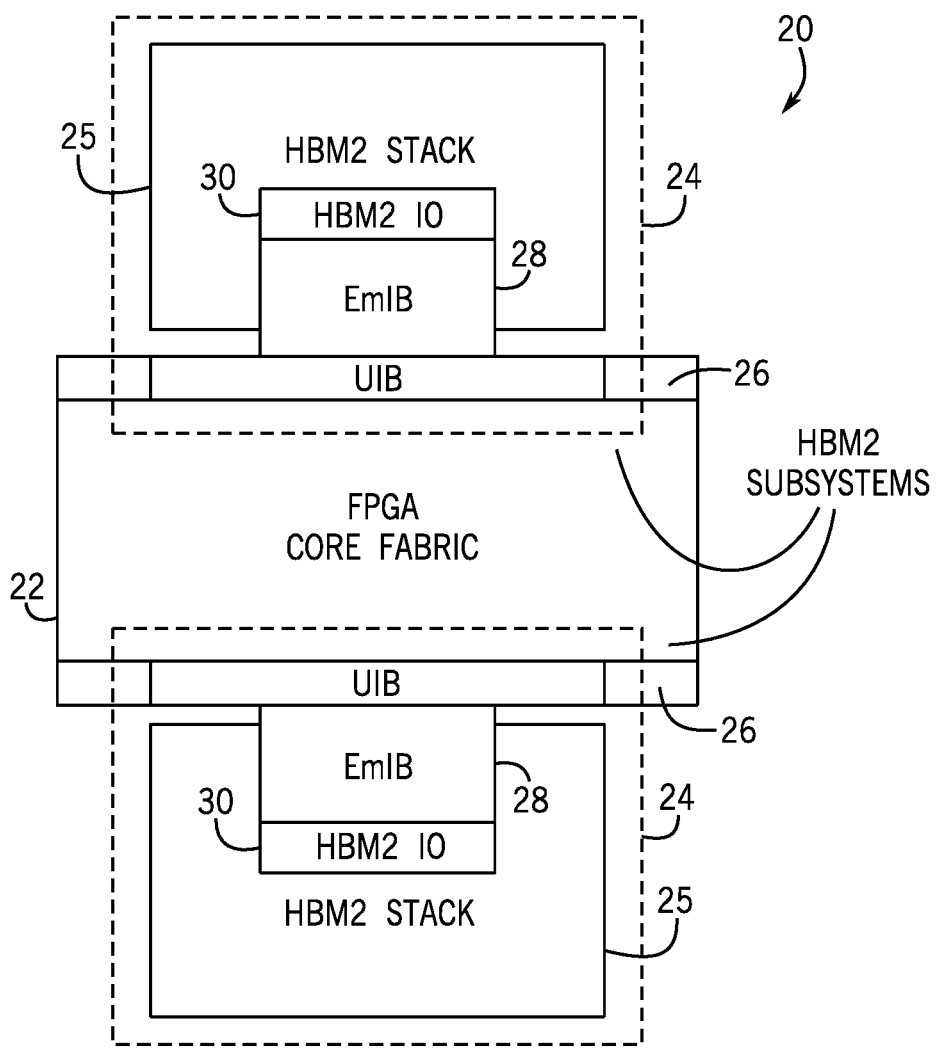
FIG. 2 illustrates a package that includes an FPGA and two memories and interfaces therebetween, in accordance with an embodiment.

FIG. 2 illustrates an embodiment of a package 20 that includes an FPGA 22 and two memories 24. The memories include HBM stacks 25 that connect to the FPGA 22 via an interface 26 and interconnect bridge 28. The memories 24 may also include an I/O portion 30 that connects the HBM2 stacks 25 to the interconnect bridge 28. The illustrated embodiment of the package 20 includes the FPGA 22. However, in some embodiments, the FPGA 22 may include any type programmable logic fabric that interfaces with any number of memories 24. Furthermore, the illustrated package 20 includes two HBM2 stacks 25, but some embodiments may include 1, 2, 3, or more HBM2 stacks 25 connected to the FPGA 22.

As illustrated, the memories 24 include HBM2 stacks 25 that interface with the FPGA 22. The bandwidth though the package 20 may be limited by interfaces 26. In some embodiments, a width (e.g., 6 mm) of micro-bumps of the interface 26 connecting to the FPGA 22 may be a limiting factor in the communication between the FPGA 22 and the memories 24. For example, the HBM2 stack can produce/consume up to 256 GB/s (2048 bits of bidirectional data running at 1 GHz) of data while a the die 12 (e.g., FPGA core fabric) over the same width is only able to handle at most 50 GB/s input and 50 GB/s output (800-bit input and 800-bit output unidirectional data running at 500 MHz) with micro-bumps having a width of 6 mm.

Widening the interfacing/shoreline of the interfaces 26 to the HBM2 stack 25 may be used to address this issue. However, the micro-bump interface of the HBM2 signals may not be widened and still maintain equidistant spacing on the interfaces 26 to preserve a matched interface architecture as specified in the HBM2 specification. Moreover, widening the interface-to-fabric shoreline may also result in higher clock insertion latency to input/output (IO) drivers/receivers for the interconnection resulting in degradation of the HBM2 channel timings. Furthermore, widening the interface-to-fabric shoreline may also introduce varying latencies across different HBM2 channels due to the lengths of the channel routes causing some channels look and behave differently than other channels.

As a further issue, the user configurations running in the FPGA 22 may often experience timings close to a frequency that may not be an integer division of the HBM2 frequency. With different HBM2 channels running at different frequencies, it may be difficult or impossible to build a generic HBM2 solution that will perform appropriately across different configurations and operations.

To address these issues, an architectural solution may be introduced to enable a widened interface-to-fabric shoreline without the disadvantages of only widening of the interface-to-fabric shoreline. The architecture described below also offers an efficient way for the FPGA's HBM2 to solve the timing closure requirements of the user IPs. Furthermore, as discussed below, the architecture also facilitates flexible timing closures for the different user configurations to interface to HBM2 stacks without compromising performance of other channels by decoupling the user configuration frequencies from the HBM2 stack. Such an architecture allows a slower programmable fabric (e.g., FPGA core fabric) to fully extract the bandwidth provided by HBM2 without compromising the fabric routability of the programmable fabric. The architecture also scales the interface architecture to allow for widened interface-to-fabric shoreline without degrading the HBM2 channel timings or internal timing closure.

Figure 3:
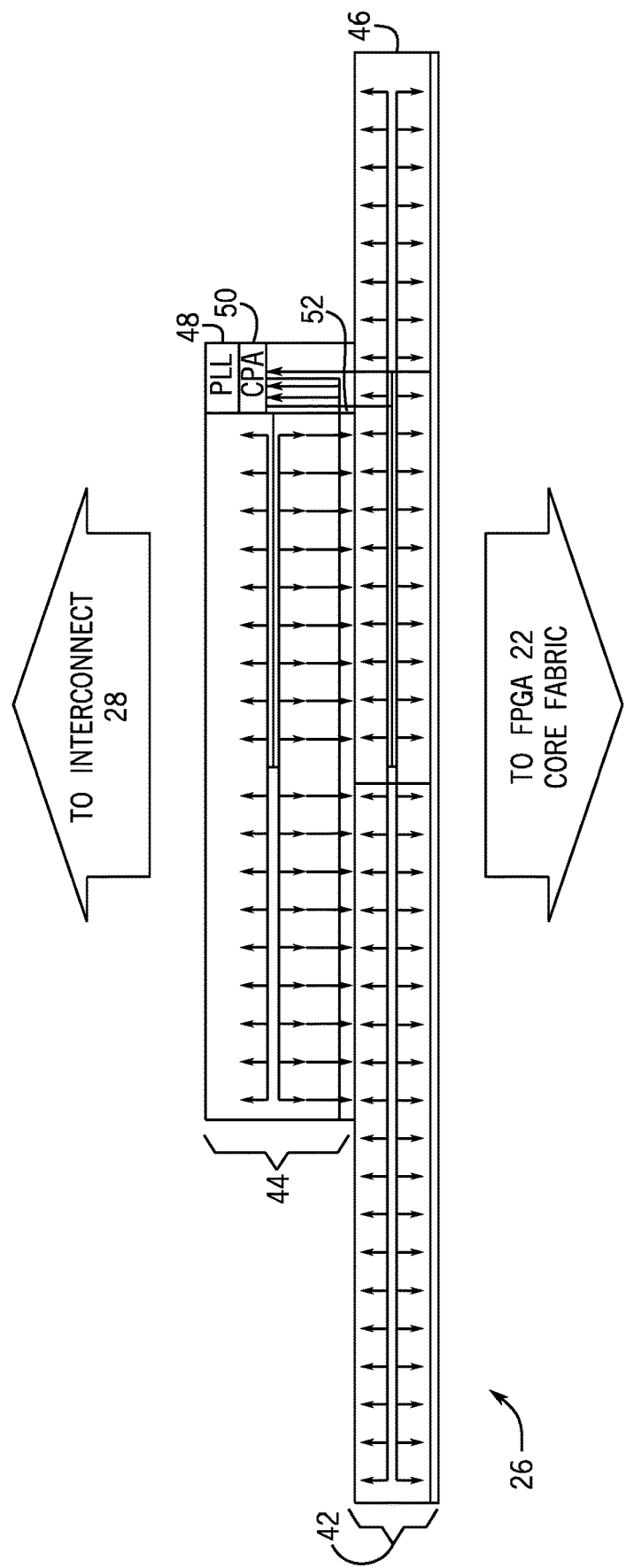
FIG. 3 illustrates an internal partitioning of blocks within an interface of FIG. 2, in accordance with an embodiment.

To resolve the mismatch in bandwidth between the HBM2 and the core fabric, the interface-to-fabric shoreline may be widened while preserving a narrower shoreline to the HBM2 stack to keep equidistant routing on interconnects. FIG. 3 illustrates an internal partitioning of blocks within the interface 26. As illustrated, the interface 26 includes a wider portion 42 of the interface 26 that interfaces with the FPGA 22 and a narrower portion 44 of the interface 26 that interfaces with the interconnect 28. The narrower portion 44 may correspond to a width of the I/O portion 30 of the HBM2 stack 25 while the wider portion 42 may be stretched to span the entire width of the interface 26 interfacing to the FPGA 22 to preserve HBM2 channel timings by stretching an HBM2 controller (HBMC) 46 an entire width of the wider portion 42. The HBMC 46 may also be clocked with a separate clock source from a phase-locked loop (PLL) 48. The clock may be phase-aligned to a clock of a physical logic layer 52 of the narrower portion 44 using clock phase adjuster (CPA) 50. This timing structure enables a larger and longer clock tree to be built to service the wider HBMC 46 without increasing the clock insertion latency of the physical logic layer 52. To preserve the HBM2 channel timings to prevent timing closure challenges for signals crossing the two independent clock trees, phase compensation FIFOs may be inserted at a boundary between the HBMC 46 and the physical logic layer 52.

Figure 4A:
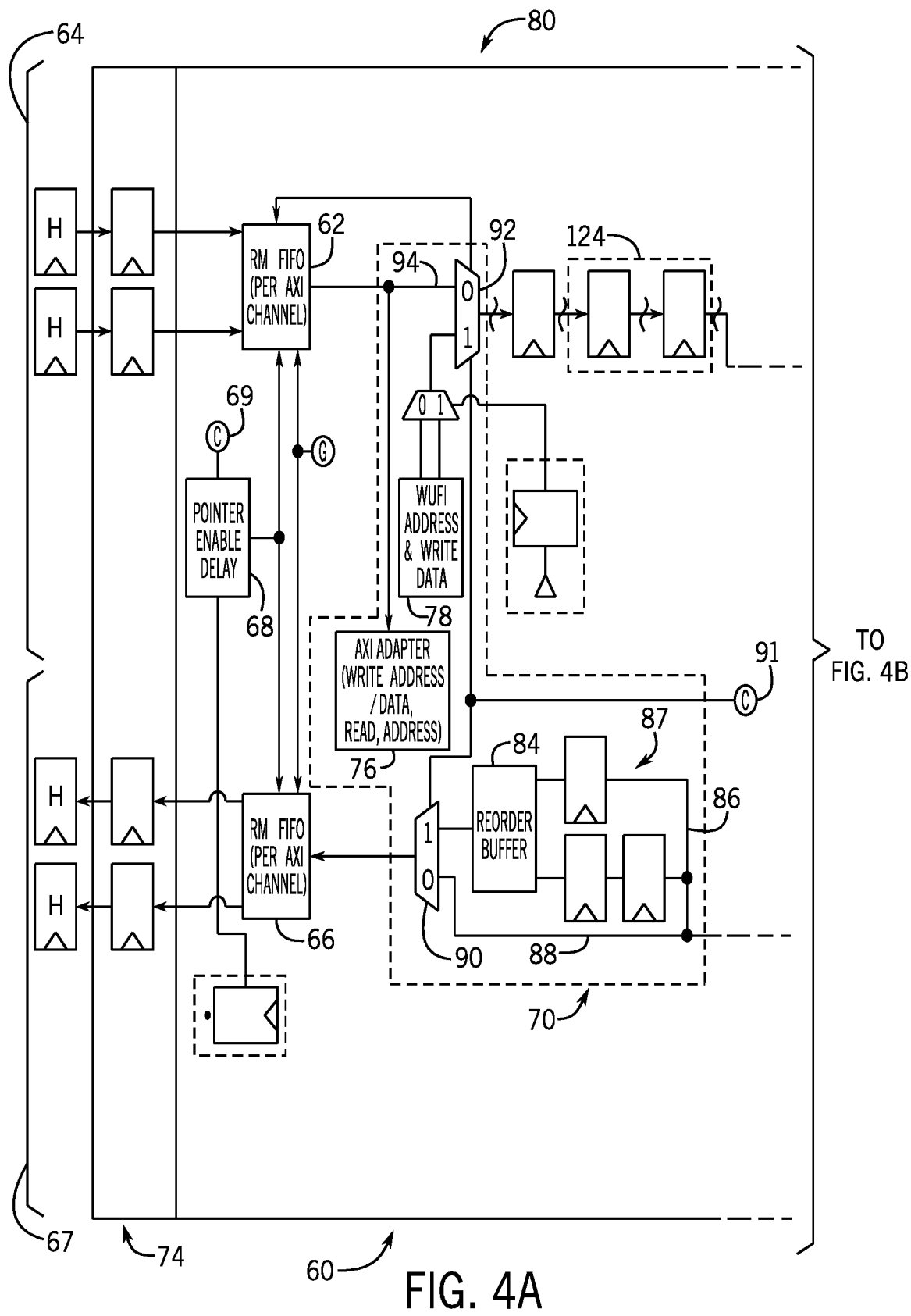
FIG. 4A illustrates a first part of an interface of FIG. 2 between a physical logic layer and the FPGA of FIG. 2, in accordance with an embodiment.
Figure 4B:
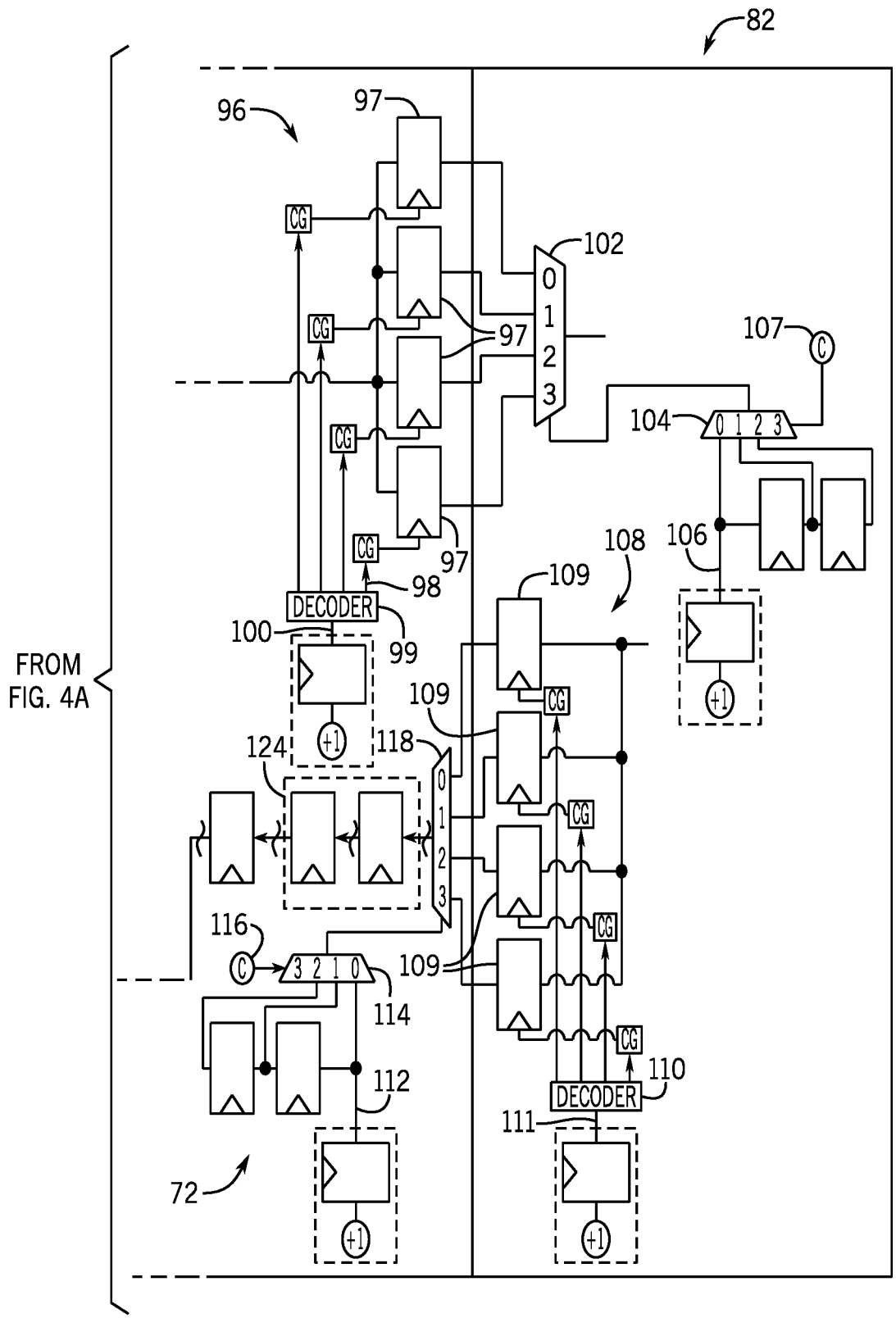
FIG. 4B illustrates a second part of an interface of FIG. 2 between a physical logic layer and the FPGA of FIG. 2, in accordance with an embodiment.

FIGS. 4A and 4B illustrate an embodiment of an interface 60 between the physical logic layer 52 and the FPGA 22. As illustrated, the HBMC 46 passes data through a first rate matching first-in first-out buffer 62 in a transmission channel 64 transmitting data from the FPGA 22 to the physical logic layer 52. The HBMC 46 also passes data through a second RMFIFO 66 in a receiving channel 67 receiving data from the physical logic layer 52 to be passed to the FPGA 22. The RMFIFOs 62 and 66 rate match the user frequencies into the interface 26 frequency. This allows decoupling of the user configuration frequencies from the interface operating frequency allowing the entire interface 26 to operate in a fully synchronous clock domain.

The transmission channel 64 and the receiving channel 67 may be included in each individual user channel implemented in the interface 26. Thus, each user channel implements a dedicated input and output channel for write data and read data to allow for both busses to run concurrently. These dedicated channels match with the input and output signal bundling within the FPGA 22. Since the user configuration side of the interface 26 tend to run slower (due to frequency limitations in the FPGA 22), the unidirectional double width busses (although in opposite directions) collectively make up for loss in bandwidth without an increase to the data bus widths. This match occurs because the HBM2 data bus is bidirectional. Thus, if equal read and write memory transactions occur, the effective HBM2 bandwidth in each direction is essentially halved (e.g., ½ of 256 GB/s=128 GB/s). Thus the unidirectional channels ensure that a user configuration may fully utilize the available per channel HBM2 bandwidth efficiently by doubling the UIB-to-fabric shoreline compared to the HBM2 micro-bump width.

The interface 60 may also include a pointer enable delay 68 that enables synchronization to ensure that various interfaces 60 of the interface 26 are enabled at the same time. In other words, interfaces 60 near a middle of the interface 26 may be delayed to ensure that the interfaces 60 near edges of the interface 26 with longer path routing may be synchronized together. The pointer enable delay 68 may be set using a configuration bit 69.

In addition to or alternative to dedicated channels per user channel with RMFIFOs 62 and 66, the HBMC 46 may partitioned into controller cores 70 and pipe staged river routes 72. One or more controller cores 70 may distributed along the shoreline. Due to the physical mismatch of the widened HBMC 46, different controller cores 70 will be routed differently with different number of pipe staged river routes 72 to achieve timing closure. For example, controller cores 70 near edges of the HBMC 46 may utilize pipe staging for n clocks more than the controller cores 70 near a center of the HBMC 46. This will result in different latencies across different memory channels within the same HBM2 stack 25 which may impede performance of the package 20.

The controller cores 70 may run at half-rate frequency of an interface 74 between the controller core 70 and the FPGA 22 to ease timing closure. In some embodiments, the controller core 70 may run out-of-order processing data in an order other than that in which it is received to increase efficiency of the interface 60. The controller core 70 includes a main adapter 76 and a phy adapter 78. For example, the main adapter 76 may include an advanced extensible interface (AXI) that provides a write address/data or read addresses in connection between an HBMC 80 and the interface 74. Additionally or alternatively, the controller core 70 may include a phy adapter 78 that provides addresses and write data to be passed to a physical layer 82 of the interface 60 from the HBMC 80.

The controller core 70 also includes a reorder buffer 84. As previously noted, the controller core 70 may handle data out-of-order. The reorder buffer 84 may be used to place the data back in order before transmission to the interface 74. The reorder buffer 84 uses reorder paths 86 and buffers 87 to reorder data. Furthermore, the reorder paths 86 may be used to apply the reordering of data in the controller core 70, or bypass path 88 may be used to bypass the controller core 70 altogether in the receiving channel 67. A multiplexer 90 may be used to select between the reorder paths 86 and the bypass path 88 according to a configuration bit 91. The configuration bit 91 may also control multiplexer 92 that controls whether the controller core 70 is used for the transmission channel 64 or bypassed in a bypass path 94.

As discussed below, the interface 74 may operate using a first clock, the HBMC 80 may use a second clock, and the physical layer 82 utilizes a third clock. The RMFIFO 62 and 66 are used to change from the first clock domain to the second clock domain. A phase compensation FIFO 96 may be used to cross from the second clock domain to the third clock domain in the transmission channel 64. The phase compensation FIFO 96 is a circular, shallow FIFO 96 that takes out flop stages to allow looser timing enclosures. These loose timing enclosures may be useful since the different clocks (e.g., second and third clocks) may have the same or similar frequencies but with high uncertainty between the clocks due to mismatched clock tree lengths. The phase compensation FIFO 96 utilizes buffers 97 that are gate clocked by control signals 98 that are decoded using a decoder 99. The decoder 99 decodes the control signals 98 from a write pointer 100. The data from the buffers 97 are passed to a multiplexer 102 that is controlled by another multiplexer 104 that selects between delayed versions of an input-output unload pointer 106. The multiplexer 104 selects between the delayed versions of the input-output unload pointer 106 using a configuration bit 107. The delayed versions of the input-output unload pointer 106 enable the interface 60 to manipulate, via the multiplexer 104, unloading of the input-output unload pointer 106 to emulate pipestages lost due to local pointer emulation. The multiplexer 102 outputs the data to the physical layer 82.

Similar to the phase compensation FIFO 96 of the transmission channel 64, the receiving channel 67 receives data from the physical layer 82 and transmits the data from the third clock domain to the second clock domain of the HBMC 80 using a phase compensation FIFO 108. The phase compensation FIFO 108 works similar to the phase compensation FIFO 96. For example, buffers 109 are similar to the buffers 97 of the phase compensation FIFO 96. Similarly, a decoder 110 functions similar to the decoder 99 using an input-output load pointer 111 instead of the input-output unload pointer 106. Also, similar to the multiplexer 102 in the transmission channel 64, the interface 60 utilizes a multiplexer 118 to pass from the physical layer 82 to the HBMC 80 based on a multiplexer 114 that selects between various iterations of a read pointer 112. The multiplexer 114 selects between the various iterations of the read pointer 112 using a configuration bit 116.

Additionally or alternatively, the transmission channel 64 and/or the receiving channel 67 may include pipestages 124 that artificially insert clock delays to the center channels of the interface 26 by unloading the data across the phase compensation FIFO 96, 108 a number of clock cycles later. The pipestages 124 may be inserted to route the distance for example to the edge HBMC (near an edge of interface 26). The additional pipestages 124 that are present on the edge HBMCs that are not present for the center HBMCs are then compensated by using the multiplexers 104 and 114 (controlled by the configuration bits 107 and 116). The multiplexers 104 and 114 select how many pipestages that are emulated for HBMCs in a center of the interface 26.

Figure 5:
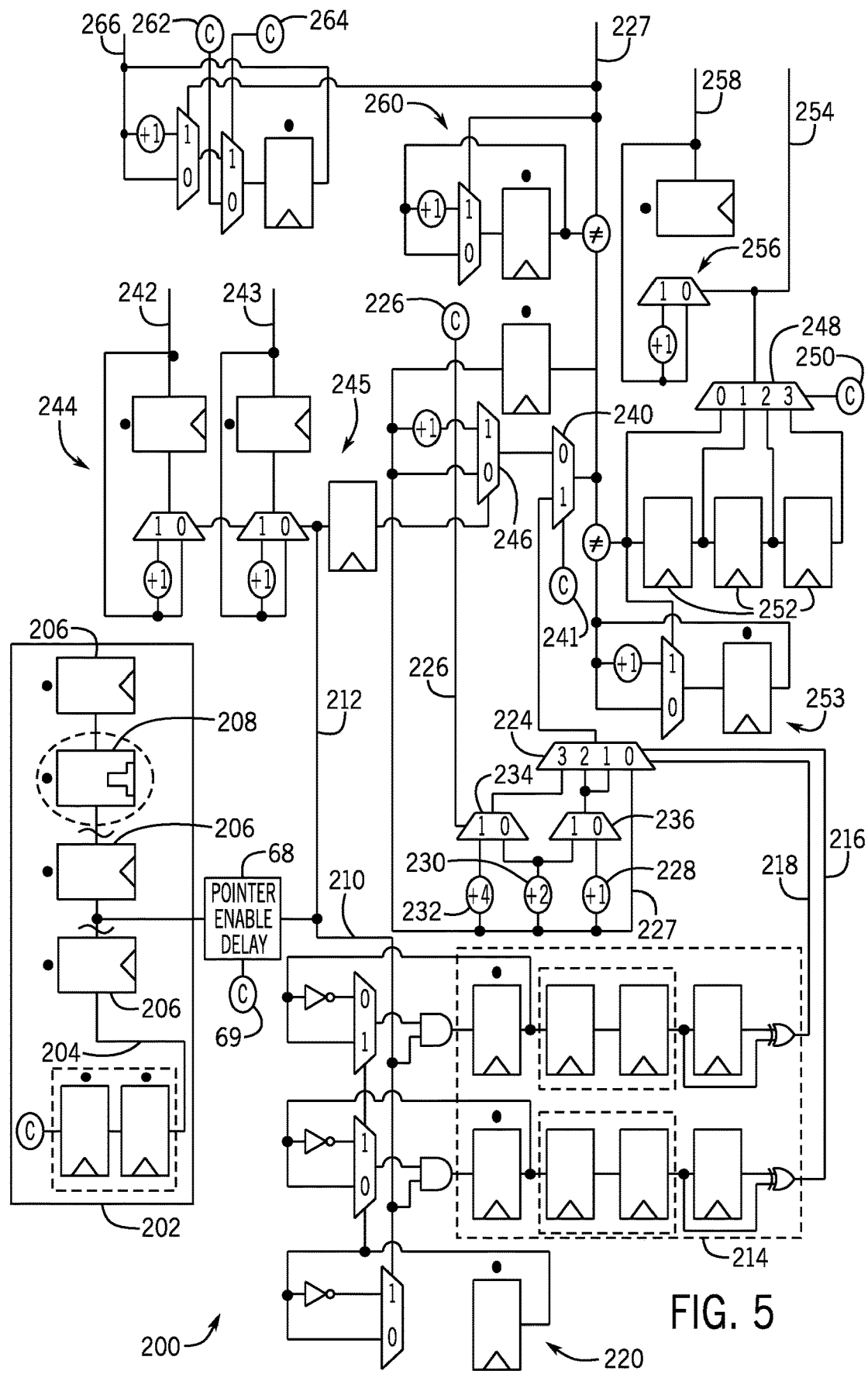
FIG. 5 illustrates control circuitry that controls rate-matching first-in-first-out (FIFO) buffers of the interface of FIGS. 4A and 4B, in accordance with an embodiment.

FIG. 5 illustrates control circuitry 200 that controls the RMFIFOs 62 and 66 of the interface 60. In some embodiments, the control circuitry 200 is embodied in the RMFIFO that it is controlling. The control circuitry 200 includes a pointer enable distribution tree 202 that distributes pointer enable delays 68 to the appropriate interfaces 60. The pointer enable distribution tree 202 receives an enable signal 204 to a chain of buffers 206 that enables synchronization of starting delay counts across interfaces 60. The pointer enable distribution tree 202 may include a latch 208 that provides locking for cross-sector pointer chains.

The pointer enable delay 68 passes along an asynchronous path 210 and a synchronous path 212. The asynchronous path 212 utilizes a synchronizer 214 that divides clock events down from the asynchronous path 212. The frequency (e.g., HBMC frequency) utilized in the right side of the synchronizer 214 and to the right of the synchronizer 214 may include a frequency that is greater than or equal to a frequency (e.g., user frequency) utilized to the left of the synchronizer 214. For example, the right-side frequency may be 1-to-4 times greater than the left-side frequency. The synchronizer 214 splits into a write odd path 216 and a write even path 218. The routing is alternated using an alternator 220. The write odd path 216 and the write even path 218 control a multiplexer 224. The multiplexer 224 outputs a signal based on a frequency control 226 that selects a frequency to be used by the RMFIFOs 62 and 66. The multiplexer 224 also selects between a ready signal 227, a first incremented ready signal 228, a second incremented ready signal 230, and a third incremented ready signal 232 via multiplexers 234 and 236 using the frequency control 226.

When the asynchronous path 210 is to be used, a synchronous enable signal 241 is causes a multiplexer 240 to output data from the asynchronous path 210. When the synchronous path 212 is to be used, a load pointer 242 and an unload pointer 243 are incremented using a load pointer incrementer 244 and an unload pointer incrementer 245. The synchronous path 212 also causes a multiplexer 246 to act as an incrementer for the ready signal 227 for entry into the multiplexer 240. The control circuitry 200 also includes a multiplexer 248 that indicates how many delays are to be applied for a core to HBMC 80 transfer. The delays selected using a delay control 250. The delays are implemented using buffers 252 and an incrementer 253 to increment the ready signal 227. The output of the multiplexer 248 is a validity signal 254 that indicates whether a valid transfer is occurring/is to occur. The validity signal 254 also controls a multiplexer 256 that increments an unload pointer 258 that tells the RMFIFO 62,64 to unload at a location. The control circuitry 200 may also include a ready signal incrementer 260. The control circuitry 200 also receives a pointer start signal 262 and a pointer reset signal 264. The pointer start signal 262 sets a point at which to start loading via a load pointer 266 after a reset using the pointer reset signal 264.

Figure 6:
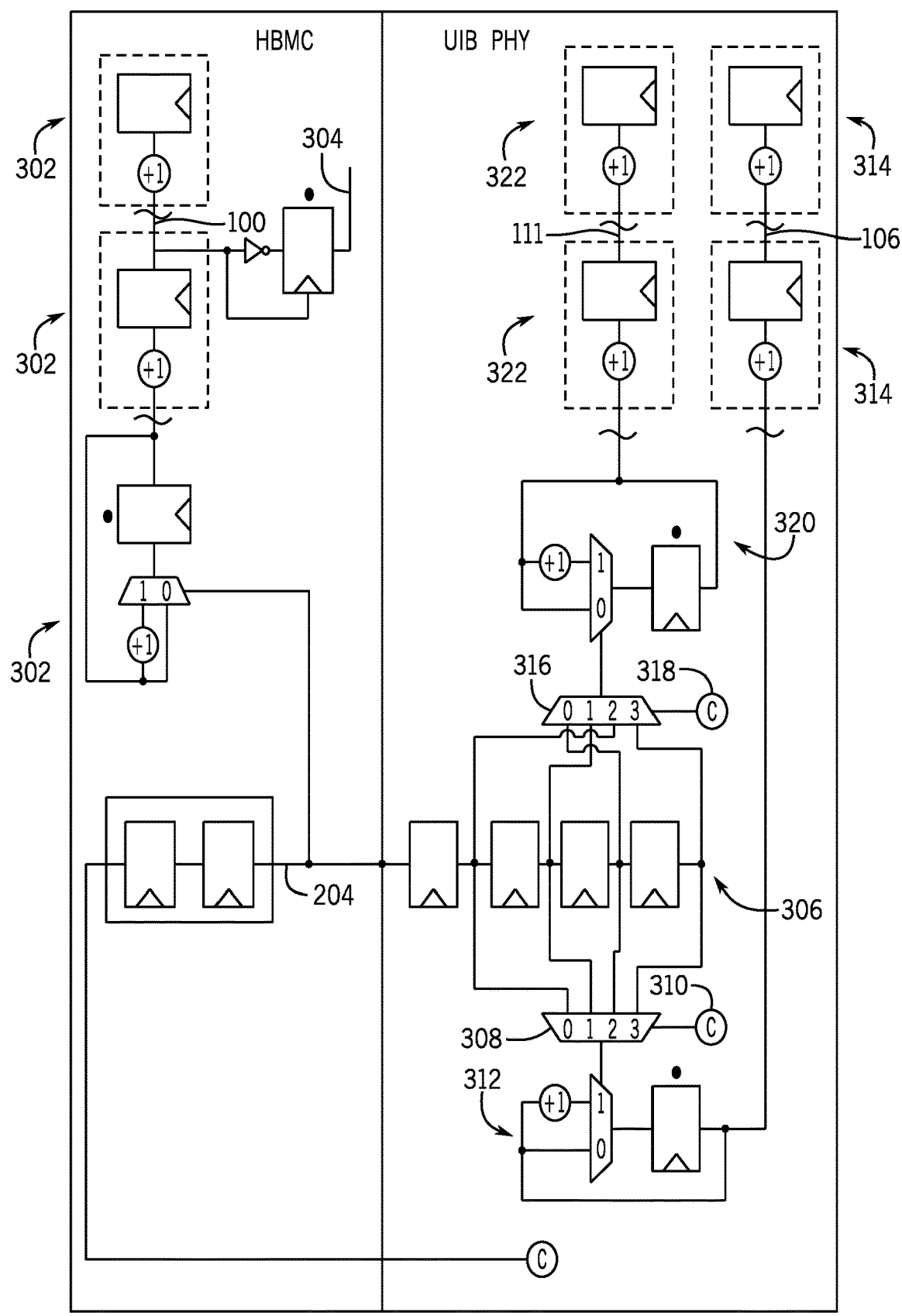
FIG. 6 illustrates a FIFO control for a phase compensation FIFO of the interface of FIGS. 4A and 4B, in accordance with an embodiment.

FIG. 6 illustrates a FIFO control 300 that is used to control the phase compensation FIFO 96 and/or 108 of the interface 60 of FIGS. 4A and 4B. The FIFO control 300 receives the enable signal 204 and passes it to a pointer incrementer chain 302. From the pointer incrementer chain 302, the write pointer 100 is generated. The pointer incrementer chain 302 may also be used to extract a half rate control signal 304 that may be used internally by the HBMC 80.

The FIFO control 300 also includes delay circuitry 306 to delay the enable signal 204. An unload multiplexer 308 selects the appropriate delayed enable signal 204 according to a control signal 310 that indicates how many cycles to delay. The selected delay is then used to increment and/or generate the unload pointer 106 using an incrementer 312 and a pointer incrementer chain 314. The unload pointer 106 is used in the interface 60 of FIG. 3.

A load multiplexer 316 selects the appropriate delayed enable signal 204 according to a control signal 318 that indicates how many cycles to delay. The selected delay is then used to increment and/or generate the load pointer 111 using a pointer incrementer chain 322. The load pointer 111 is used in the interface 60 of FIG. 3.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Embodiments of the Current Application

The following numbered clauses define embodiments of the current application.

Clause A1. An integrated circuit device package, comprising:
 a programmable logic circuit;
 an interface comprising a plurality of channels each comprising a plurality of rate-matching first-in first-outs (FIFOs) buffers, wherein the interface couples the programmable logic circuit to another circuit, wherein the interface:
  communicates with the programmable logic fabric using a first clock domain;
  uses another circuit controller that controls the other circuit, wherein the other circuit controller uses a second clock domain; and communicates with a physical layer, wherein each rate-matching FIFO of the plurality of rate-matching FIFOs transfers from the first clock domain to the second clock domain or from the second clock domain to the first clock domain for a corresponding channel of the plurality of channels.

Clause A2. The integrated circuit device package of clause A1, wherein the rate-matching FIFO buffers comprises a control circuit that controls the transfer from the first clock domain to the second clock domain or from the second clock domain to the first clock domain.

Clause A3. The integrated circuit device package of clause A2, wherein the control circuit comprises a pointer enable distribution tree that provides a plurality of pointer enable delays that synchronize counting starts in the plurality of channels.

Clause A4. The integrated circuit device package of clause A3, wherein a counting start in an outside channel of the plurality of channels at an edge of the interface is delayed less in the pointer enable distribution tree than a counting start in a center channel of the plurality of channels at a center of the interface.

Clause A5. The integrated circuit device package of clause A1, wherein each channel of the plurality of channels comprises:
a transmission channel; and
a receiving channel.

Clause A6. The integrated circuit device package of clause A5, wherein the transmissions channel transmits data to the physical layer from the programmable logic circuit through the other circuit controller.

Clause A7. The integrated circuit device package of clause A6, wherein the other circuit comprises a high-bandwidth memory controller.

Clause A8. The integrated circuit device package of clause A5, wherein the receiving channel receives data from the physical layer to the programmable logic circuit through the other circuit controller.

Clause A9. The integrated circuit device package of clause A8, wherein the other circuit controller comprises a high-bandwidth memory generation 2 memory controller circuit.

Clause A10. The integrated circuit device package of clause A1, wherein the first clock domain driven by a first clock that is slower or equal than a second clock that drives the second clock domain.

Clause A11. A device package comprising:
a programmable logic circuit operating in a first clock domain driven by a first clock;
a memory controller operating in a second clock domain driven by a second clock, wherein a speed of the first clock is less than or equal to a speed of the second clock; and
an interface between the programmable logic circuit that provides transfers between the programmable logic circuit in the first clock domain and the memory controller in the second clock domain, wherein the interface comprises:
 a programmable logic circuit edge that couples to the programmable logic circuit and extends a width of the programmable logic circuit; and
 a memory controller edge that couples to the memory controller and is narrower than the programmable logic circuit edge to provide equidistant routing on interconnects in the interface.

Clause A12. The device package of clause A11, wherein the memory controller comprises a high-bandwidth memory generation 2 memory controller.

Clause A13. The device package of clause A11 comprising a rate-matching first-in first-out (FIFO) buffer that transfers between programmable logic circuit having the first clock domain and the memory controller having the second clock domain.

Clause A14. The device package of clause A13, wherein the rate-matching FIFO buffer comprises a control circuit that controls pointers used to transfer between memory controller and programmable logic circuit, wherein the rate-matching FIFO buffer selects between an asynchronous path and a synchronous path of the control circuit based on a synchronous enable signal.

Clause A15. The device package of clause A11 comprising:
a physical layer operating in a third clock domain driven by a third clock; and
a phase compensation first-in first-out (FIFO) buffer that controls transfers between the physical layer having the third clock domain and the memory controller having the second clock domain.

Clause A16. The device package of clause A15 comprising a pointer incrementer chain that receives an enable signal and uses the enable signal to generate a write pointer that is used by the phase compensation FIFO buffer to transfer between the physical layer and the memory controller.

Clause A17. The device package of clause A15 comprising a FIFO buffer control that generates a load pointer and unload pointer that is used by the phase compensation FIFO buffer to transfer between the physical layer and the memory controller.

Clause A18. The device package of clause A17, wherein the interface comprises:
a transmission channel that transfers from the memory controller to the physical layer, wherein the phase compensation FIFO buffer uses the load pointer in transfers in the transmission channel; and
a receiving channel that transfers from the physical layer to the memory controller, wherein the phase compensation FIFO buffer uses the unload pointer in transfers in the receiving channel.

Clause A19. The device package of clause A11, comprising:
a plurality of memory controllers comprising the memory controller; and
pipestage emulation to equalize delays between the plurality of memory controllers.

Clause A20. A memory interface apparatus comprising:
a programmable logic core interface that interfaces with a programmable logic core using a first clock;
a high-bandwidth memory generation 2 (HBM2) interface that interfaces with an HBM2 stack using a second clock;
a rate-matching first-in first-out (FIFO) buffer that transfers between a first clock domain of the programmable logic core driven by the first clock and a second clock domain of the HBM2 stack driven by the second clock;
a physical layer interface that interfaces with a physical layer using a third clock; and
a phase compensation FIFO buffer that transfers between the second clock domain and a third clock domain of the physical layer driven by the third clock.

Clause A21. The memory interface apparatus of clause A20 comprising:
control circuit for the rate-matching FIFO buffer incorporated into the rate-matching FIFO buffer, wherein the control circuit for the rate-matching FIFO buffer controls where the rate-matching FIFO buffer is to load or unload data being transferred; and phase compensation FIFO buffer control circuit that generates pointers to be used in transfers between the second clock domain and a third clock domain of the physical layer driven by the third clock.

Clause A22. The memory interface apparatus of clause A21, comprising a plurality of channels each comprising the programmable logic core interface, the HBM2 interface, the rate-matching FIFO buffer, a physical layer interface, the phase compensation FIFO buffer, and a plurality of advanced extensible interfaces, wherein each of the plurality of advanced extensible interfaces provides addresses and write data to be passed to the corresponding physical layer interface.

Clause B1. An integrated circuit device package for interfacing with a programmable logic circuit, comprising:
a programmable logic circuit;
an interface comprising a plurality of channels each comprising a plurality of rate-matching first-in first-outs (FIFO) buffers, wherein the interface couples the programmable logic circuit to another circuit, wherein the interface:
communicates with the programmable logic fabric using a first clock domain;
uses another circuit controller that controls the other circuit, wherein the other circuit controller uses a second clock domain; and
communicates with a physical layer, wherein each rate-matching FIFO buffer of the plurality of rate-matching FIFO buffers transfers from the first clock domain to the second clock domain or from the second clock domain to the first clock domain for a corresponding channel of the plurality of channels.

Clause B2. The integrated circuit device package of clause B1, wherein the rate-matching FIFO buffer comprises a control circuit that controls the transfer from the first clock domain to the second clock domain or from the second clock domain to the first clock domain.

Clause B3. The integrated circuit device package of clause B2, wherein the control circuit comprises a pointer enable distribution tree that provides a plurality of pointer enable delays that synchronize counting starts in the plurality of channels.

Clause B4. The integrated circuit device package of clause B3, wherein a counting start in an outside channel of the plurality of channels at an edge of the interface is delayed less in the pointer enable distribution tree than a counting start in a center channel of the plurality of channels at a center of the interface.

Clause B5. The integrated circuit device package of any of clause B1, 2, 3, or 4, wherein each channel of the plurality of channels comprises:
a transmission channel; and
a receiving channel.

Clause B6. The integrated circuit device package of clause B5, wherein the transmissions channel transmits data to the physical layer from the programmable logic circuit through the other circuit controller.

Clause B7. The integrated circuit device package of clause B6, wherein the other circuit controller comprises a high-bandwidth memory controller.

Clause B8. The integrated circuit device package of any of clause B5, 6, or 7, wherein the receiving channel receives data from the physical layer to the programmable logic circuit through the other circuit controller.

Clause B9. The integrated circuit device package of clause B8, wherein the other circuit controller comprises a high-bandwidth memory generation 2 memory controller circuit.

Clause B10. The integrated circuit device package of any of clause B1, 2, 3, 4, 5, 6, 7, 8, or 9, wherein the first clock domain driven by a first clock that is slower or equal than a second clock that drives the second clock domain.

Clause B11. A device package comprising:
a programmable logic circuit operating in a first clock domain driven by a first clock;
a memory controller operating in a second clock domain driven by a second clock, wherein a speed of the first clock is less than or equal to a speed of the second clock; and
an interface between the programmable logic circuit that provides transfers between the programmable logic circuit in the first clock domain and the memory controller in the second clock domain, wherein the interface comprises:
a programmable logic circuit edge that couples to the programmable logic circuit and extends a width of the programmable logic circuit; and
a memory controller edge that couples to the memory controller and is narrower than the programmable logic circuit edge to provide equidistant routing on interconnects in the interface.

Clause B12. The device package of clause B11, wherein the memory controller comprises a high-bandwidth memory generation 2 memory controller.

Clause B13. The device package of any of clause B11 or 12 comprising a rate-matching first-in first-out (FIFO) buffer that transfers between programmable logic circuit having the first clock domain and the memory controller having the second clock domain.

Clause B14. The device package of clause B13, wherein the rate-matching FIFO buffer comprises a control circuit that controls pointers used to transfer between memory controller and programmable logic circuit, wherein the rate-matching FIFO buffer selects between an asynchronous path and a synchronous path of the control circuit based on a synchronous enable signal.

Clause B15. The device package of any of clause B11, 12, 13, or 14 comprising:
a physical layer operating in a third clock domain driven by a third clock; and
a phase compensation first-in first-out (FIFO) buffer that controls transfers between the physical layer having the third clock domain and the memory controller having the second clock domain.

Clause B16. The device package of clause B15 comprising a pointer incrementer chain that receives an enable signal and uses the enable signal to generate a write pointer that is used by the phase compensation FIFO buffer to transfer between the physical layer and the memory controller.

Clause B17. The device package of any of clause B15 or 16 comprising a FIFO buffer control that generates a load pointer and unload pointer that is used by the phase compensation FIFO buffer to transfer between the physical layer and the memory controller.

Clause B18. The device package of clause B17, wherein the interface comprises:
a transmission channel that transfers from the memory controller to the physical layer, wherein the phase compensation FIFO buffer uses the load pointer in transfers in the transmission channel; and
a receiving channel that transfers from the physical layer to the memory controller, wherein the phase compensation FIFO buffer uses the unload pointer in transfers in the receiving channel.

Clause B19. The device package of any of clause B11, 12, 13, 14, 15, 16, 17, or 18, comprising:

a plurality of memory controllers comprising the memory controller; and pipestage emulation to equalize delays between the plurality of memory controllers.

Clause B20. A memory interface apparatus comprising:

a programmable logic core interface that interfaces with a programmable logic core using a first clock;

a high-bandwidth memory generation 2 (HBM2) interface that interfaces with an HBM2 stack using a second clock;

a rate-matching first-in first-out (FIFO) buffer that transfers between a first clock domain of the programmable logic core driven by the first clock and a second clock domain of the HBM2 stack driven by the second clock;

a physical layer interface that interfaces with a physical layer using a third clock; and a phase compensation FIFO buffer that transfers between the second clock domain and a third clock domain of the physical layer driven by the third clock.

Clause B21. The memory interface apparatus of clause B20 comprising:

control circuit for the rate-matching FIFO buffer incorporated into the rate-matching FIFO buffer, wherein the control circuit for the rate-matching FIFO buffer controls where the rate-matching FIFO buffer is to load or unload data being transferred; and phase compensation FIFO buffer control circuit that generates pointers to be used in transfers between the second clock domain and a third clock domain of the physical layer driven by the third clock.

Clause B22. The memory interface apparatus of clause B21, comprising a plurality of channels each comprising the programmable logic core interface, the HBM2 interface, the rate-matching FIFO buffer, a physical layer interface, the phase compensation FIFO buffer, and a plurality of advanced extensible interfaces, wherein each of the plurality of advanced extensible interfaces provides addresses and write data to be passed to the corresponding physical layer interface.

Clause C1. An integrated circuit device package for interfacing with a programmable logic circuit, comprising:

a programmable logic circuit;

an interface comprising a plurality of channels each comprising a plurality of rate-matching first-in first-outs (FIFO) buffers, wherein the interface couples the programmable logic circuit to another circuit, wherein the interface:

communicates with the programmable logic fabric using a first clock domain;

uses another circuit controller that controls the other circuit, wherein the other circuit controller uses a second clock domain; and communicates with a physical layer, wherein each rate-matching FIFO buffer of the plurality of rate-matching FIFO buffers transfers from the first clock domain to the second clock domain or from the second clock domain to the first clock domain for a corresponding channel of the plurality of channels.

Clause C2. The integrated circuit device package of clause C1, wherein the rate-matching FIFO buffer comprises a control circuit that controls the transfer from the first clock domain to the second clock domain or from the second clock domain to the first clock domain.

Clause C3. The integrated circuit device package of clause C2, wherein the control circuit comprises a pointer enable distribution tree that provides a plurality of pointer enable delays that synchronize counting starts in the plurality of channels.

Clause C4. The integrated circuit device package of clause C3, wherein a counting start in an outside channel of the plurality of channels at an edge of the interface is delayed less in the pointer enable distribution tree than a counting start in a center channel of the plurality of channels at a center of the interface.

Clause C5. The integrated circuit device package of any of clause C1, 2, 3, or 4, wherein each channel of the plurality of channels comprises:

a transmission channel; and a receiving channel.

Clause C6. The integrated circuit device package of clause C5, wherein the transmissions channel transmits data to the physical layer from the programmable logic circuit through the other circuit controller.

Clause C7. The integrated circuit device package of clause C6, wherein the other circuit controller comprises a high-bandwidth memory controller.

Clause C8. The integrated circuit device package of any of clause C5, 6, or 7, wherein the receiving channel receives data from the physical layer to the programmable logic circuit through the other circuit controller.

Clause C9. The integrated circuit device package of clause C8, wherein the other circuit controller comprises a high-bandwidth memory generation 2 memory controller circuit.

Clause C10. The integrated circuit device package of any of clause C1, 2, 3, 4, 5, 6, 7, 8, or 9, wherein the first clock domain driven by a first clock that is slower or equal than a second clock that drives the second clock domain.

Clause C11. The integrated circuit device package of any of clause C1, 2, 3, 4, 5, 6, 7, 8, 9, or 10, wherein the other circuit comprises a memory controller, wherein the interface comprises:

a programmable logic circuit edge that couples to the programmable logic circuit and extends a width of the programmable logic circuit; and a memory controller edge that couples to the memory controller and is narrower than the programmable logic circuit edge to provide equidistant routing on interconnects in the interface.

Clause C12. The integrated circuit device package of clause C11, wherein the memory controller comprises a high-bandwidth memory generation 2 memory controller.

Clause C13. The integrated circuit device package of clause C11 or 12, wherein the rate-matching FIFO buffer comprises a control circuit that controls pointers used to transfer between memory controller and programmable logic circuit, wherein the rate-matching FIFO buffer selects between an asynchronous path and a synchronous path of the control circuit based on a synchronous enable signal.

Clause C14. The integrated circuit device package of any of clause C11, 12, or 13 comprising:

a physical layer operating in a third clock domain driven by a third clock; and a phase compensation first-in first-out (FIFO) buffer that controls transfers between the physical layer having the third clock domain and the memory controller having the second clock domain.

Clause C15. The integrated circuit device package of clause C14 comprising a pointer incrementer chain that receives an enable signal and uses the enable signal to generate a write pointer that is used by the phase compensation FIFO buffer to transfer between the physical layer and the memory controller.

Clause C16. The integrated circuit device package of any of clause C14 or 15 comprising a FIFO buffer control that generates a load pointer and unload pointer that is used by the phase compensation FIFO buffer to transfer between the physical layer and the memory controller.

Clause C17. The device package of clause C11, 12, 13, 14, 15, or 16, wherein the interface comprises:

a transmission channel that transfers from the memory controller to the physical layer, wherein the phase compensation FIFO buffer uses the load pointer in transfers in the transmission channel; and a receiving channel that transfers from the physical layer to the memory controller, wherein the phase compensation FIFO buffer uses the unload pointer in transfers in the receiving channel.

Clause C18. The device package of any of clause C11, 12, 13, 14, 15, 16, or 17, comprising:

a plurality of memory controllers comprising the memory controller; and pipestage emulation to equalize delays between the plurality of memory controllers.

Clause C19. A memory interface apparatus comprising:

a programmable logic core interface that interfaces with a programmable logic core using a first clock;

a high-bandwidth memory generation 2 (HBM2) interface that interfaces with an HBM2 stack using a second clock;

a rate-matching first-in first-out (FIFO) buffer that transfers between a first clock domain of the programmable logic core driven by the first clock and a second clock domain of the HBM2 stack driven by the second clock;

a physical layer interface that interfaces with a physical layer using a third clock; and a phase compensation FIFO buffer that transfers between the second clock domain and a third clock domain of the physical layer driven by the third clock.

Clause C20. The memory interface apparatus of clause C19 comprising:

control circuit for the rate-matching FIFO buffer incorporated into the rate-matching FIFO buffer, wherein the control circuit for the rate-matching FIFO buffer controls where the rate-matching FIFO buffer is to load or unload data being transferred; and phase compensation FIFO buffer control circuit that generates pointers to be used in transfers between the second clock domain and a third clock domain of the physical layer driven by the third clock.

Clause C21. The memory interface apparatus of clause C20, comprising a plurality of channels each comprising the programmable logic core interface, the HBM2 interface, the rate-matching FIFO buffer, a physical layer interface, the phase compensation FIFO buffer, and a plurality of advanced extensible interfaces, wherein each of the plurality of advanced extensible interfaces provides addresses and write data to be passed to the corresponding physical layer interface.

What is claimed is:

1. A device package comprising:

a programmable logic circuit operating in a first clock domain driven by a first clock;

a memory controller operating in a second clock domain driven by a second clock, wherein a speed of the first clock is less than or equal to a speed of the second clock; and an interface between the programmable logic circuit that provides transfers between the programmable logic circuit in the first clock domain and the memory controller in the second clock domain, wherein the interface comprises:

a programmable logic circuit edge that couples to the programmable logic circuit and extends a width of the programmable logic circuit;

a memory controller edge that couples to the memory controller and is narrower than the programmable logic circuit edge to provide equidistant routing on interconnects in the interface;

a physical layer operating in a third clock domain driven by a third clock; and a phase compensation first-in first-out (FIFO) buffer that controls transfers between the physical layer having the third clock domain and the memory controller having the second clock domain.

2. The device package of claim 1, wherein the memory controller comprises a high-bandwidth memory generation 2 memory controller.

3. The device package of claim 1 comprising a rate-matching first-in first-out (FIFO) buffer that transfers between the programmable logic circuit having the first clock domain and the memory controller having the second clock domain.

4. The device package of claim 3, wherein the rate-matching FIFO buffer comprises a control circuit that controls pointers used to transfer between the memory controller and the programmable logic circuit, wherein the rate-matching FIFO buffer selects between an asynchronous path and a synchronous path of the control circuit based on a synchronous enable signal.

5. The device package of claim 1 comprising a pointer incrementer chain that receives an enable signal and uses the enable signal to generate a write pointer that is used by the phase compensation FIFO buffer to transfer between the physical layer and the memory controller.

6. The device package of claim 1 comprising a FIFO buffer control that generates a load pointer and unload pointer that is used by the phase compensation FIFO buffer to transfer between the physical layer and the memory controller.

7. An integrated circuit device package, comprising:

a programmable logic circuit;

an interface comprising a plurality of channels each comprising a plurality of rate-matching first-in first-outs (FIFO) buffers, wherein the interface couples the programmable logic circuit to another circuit, wherein the interface:

communicates with the programmable logic circuit using a first clock domain;

uses another circuit controller that controls the other circuit, wherein the other circuit controller uses a second clock domain; and communicates with a physical layer, wherein each rate-matching FIFO buffer of the plurality of rate-matching FIFO buffers transfers from the first clock domain to the second clock domain or from the second clock domain to the first clock domain for a corresponding channel of the plurality of channels, wherein a rate-matching FIFO buffer of the plurality of rate-matching FIFO buffers comprises a control circuit that controls the transfer from the first clock domain to the second clock domain or from the second clock domain to the first clock domain, and the control circuit comprises a pointer enable distribution tree that provides a plurality of pointer enable delays that synchronize counting starts in the plurality of channels.

8. The integrated circuit device package of claim 7, wherein a counting start in an outside channel of the plurality of channels at an edge of the interface is delayed less in the pointer enable distribution tree than a counting start in a center channel of the plurality of channels at a center of the interface.

9. The integrated circuit device package of claim 7, wherein each channel of the plurality of channels comprises:
   a transmission channel; and
   a receiving channel.

10. The integrated circuit device package of claim 9, wherein the transmissions channel transmits data to the physical layer from the programmable logic circuit through the other circuit controller.

11. The integrated circuit device package of claim 10, wherein the other circuit controller comprises a high-bandwidth memory controller.

12. The integrated circuit device package of claim 9, wherein the receiving channel receives data from the physical layer to the programmable logic circuit through the other circuit controller.

13. The integrated circuit device package of claim 12, wherein the other circuit controller comprises a high-bandwidth memory generation 2 memory controller circuit.

14. The integrated circuit device package of claim 7, wherein the first clock domain is driven by a first clock that is slower than or equal to a second clock that drives the second clock domain.

15. A memory interface apparatus comprising:
   a programmable logic core interface that interfaces with a programmable logic core using a first clock;
   a high-bandwidth memory generation 2 (HBM2) interface that interfaces with an HBM2 stack using a second clock;
   a rate-matching first-in first-out (FIFO) buffer that transfers between a first clock domain of the programmable logic core driven by the first clock and a second clock domain of the HBM2 stack driven by the second clock;
   a physical layer interface that interfaces with a physical layer using a third clock; and
   a phase compensation FIFO buffer that transfers between the second clock domain and a third clock domain of the physical layer driven by the third clock.

16. The memory interface apparatus of claim 15 comprising:
   control circuit for the rate-matching FIFO buffer incorporated into the rate-matching FIFO buffer, wherein the control circuit for the rate-matching FIFO buffer controls where the rate-matching FIFO buffer is to load or unload data being transferred; and
   phase compensation FIFO buffer control circuit that generates pointers to be used in transfers between the second clock domain and the third clock domain of the physical layer driven by the third clock.

17. The memory interface apparatus of claim 16, comprising a plurality of channels each comprising the programmable logic core interface, the HBM2 interface, the rate-matching FIFO buffer, a physical layer interface, the phase compensation FIFO buffer, and a plurality of advanced extensible interfaces, wherein each of the plurality of advanced extensible interfaces provides addresses and write data to be passed to the corresponding physical layer interface.

* * * * *